(12) United States Patent
Sjölander

(10) Patent No.: US 7,644,096 B2
(45) Date of Patent: Jan. 5, 2010

(54) METHOD FOR STORING AND ACCESSING DATA

(75) Inventor: David Sjölander, Helsingborg (SE)

(73) Assignee: Sony Ericsson Mobile Communications AB, Lund (SE)

( * ) Notice: Subject to any disclaimer, the term of this patent is extended or adjusted under 35 U.S.C. 154(b) by 451 days.

(21) Appl. No.: 11/537,664

(22) Filed: Oct. 2, 2006

(65) Prior Publication Data

US 2008/0082298 A1     Apr. 3, 2008

(51) Int. Cl.
 *G06F 17/30*   (2006.01)
 *G06F 7/00*    (2006.01)
(52) U.S. Cl. .............. 707/101; 707/102; 707/104.1
(58) Field of Classification Search ............ 707/101, 707/102, 104.1
See application file for complete search history.

(56) References Cited

U.S. PATENT DOCUMENTS

| | | | |
|---|---|---|---|
| 6,633,565 B1* | 10/2003 | Bronstein et al. | 370/392 |
| 2002/0111819 A1* | 8/2002 | Li et al. | 705/1 |
| 2005/0132401 A1* | 6/2005 | Boccon-Gibod et al. | 725/34 |
| 2005/0138111 A1* | 6/2005 | Aton et al. | 709/201 |
| 2006/0007315 A1* | 1/2006 | Singh | 348/207.99 |

OTHER PUBLICATIONS

Westermann, et al., "A Generic Event Model for Event-Centric Multimedia Data Management in eChronicle Applications", IEEE, Proceedings of the 22nd International Conference on Data Engineering Workshops, (2006).

* cited by examiner

*Primary Examiner*—Kuen S Lu
(74) *Attorney, Agent, or Firm*—Renner, Otto, Boisselle & Sklar, LLP

(57) ABSTRACT

A method for storing data in an electronic device, using tags to mark events carried out in the electronic device during a certain time period. The method involves defining a tag which is assignable to data related to events which are carried out and stored using the electronic device; defining a time period for using the tag; and configuring the electronic device to assign the tag to data related to all events stored using the electronic device during said time period. The tag may be used for all events of only one type, such as pictures captured using a digital camera. Alternatively, the tags may be used for a plurality of types of events, such as for captured pictures or videos, received virtual business cards, calls dialed or received, messages sent or received, and so on. Data associated with an event related to a certain occasion may then be searched and accessed using a tag register.

10 Claims, 3 Drawing Sheets

Configure tag

Title:

Set time:

From now on and forward

Start (yy/mm/dd)

Stop (yy/mm/dd)

All ☐   Picture ☐   Video ☐
VBC ☐   SMS ☐   MMS ☐
Calls ☐  Web ☐   Audio ☐

Fig. 3

Tags

Define new

Hawaii Vacation 2005

London Medical Congress 2005

Paris Motor Show 2006

METHOD FOR STORING AND ACCESSING DATA

FIELD OF THE INVENTION

The present invention relates to electronic devices usable for carrying out different tasks or events, such as communicating with other electronic devices and creating and receiving data. Such events are stored as data relating to the event, such as object data in the form of program files, or as log data. Typically, the invention therefore relates to electronic devices in the form of computers or mobile phones. More specifically, the invention relates to a method for tagging events in order to assign a certain category to the events, wherein one and the same tag is used for all events carried out within a certain time period.

BACKGROUND

The use of electronic devices such as computers, mobile phones, and audio/video equipment has had enormous development in the world in the last decades. A lot of effort has been made in making smaller electronic devices, in particular for portable use, such as mobile phones, laptop computers, Personal Digital Assistants (PDA), mp3 players, and so on. Much help has been obtained from the miniaturization of electronic components and the development of more efficient batteries. In mobile communications, the communication systems have gone from analogue to digital, and at the same time the dimensions of the communication mobile phones have gone from briefcase size to the pocket size phones of today, in only a couple of decades. Still today, mobile phones are getting smaller and smaller and the size is generally considered to be an important factor for the end customer.

Regarding mobile phones as well as portable computers and PDA:s, the end users have a number of conflicting requirements. Basically, the device should be as small and light-weight as possible. Furthermore, it should provide more and more advanced functions, have a long battery time, and have a user-friendly interface. Still, there is only so much space in an electronic device, and in order to be competitive the elements of the device must be carefully packaged. The compact size of e.g. mobile phones also means that the user interface, typically a display and a set of keys, is limited. In order to access the different functions and stored items, different types of menu systems are often employed. Still, it may sometimes be difficult to find certain items if it is less than obvious under which menu label to search.

In the field of digital photography, the concept of tagging has gain a lot of interest in the past. A tag is like a keyword or category label, which can be assigned to a digital photo, and is helpful for finding photos which have something in common. Typically, it is possible to assign as many tags as you wish to each photo. Furthermore, if photos, i.e. image files, are stored where they are accessible by more than one person, such as on a network server, it may also be possible for different users to add different tags to the photos.

If, on the other hand, a user wants to recall if a certain phone call has been placed of answered, it is generally possible to search a call register for a trace of the call, unless it has been deleted. Similarly, if a user is anxious to check if and when a message was sent or received, the message inbox and outbox, respectively, may be investigated.

A problem related to the issue of tracing past events carried out by means of an electronic device is that different types of events have to be investigated in different ways, and through different menu channels. This makes searching for event records time-consuming and increases the risk of missing what you are looking for.

SUMMARY OF THE INVENTION

A general object of the invention is therefore to provide a solution for storing data related to events carried out using an electronic device, which facilitates subsequent searching for such event-related data.

According to a first aspect, this object is fulfilled by a method for storing data in an electronic device, comprising the steps of:
 defining a tag which is assignable to data related to events which are carried out and stored using the electronic device;
 defining a time period for using the tag;
 configuring the electronic device to assign the tag to data related to all events stored using the electronic device during said time period.

In one embodiment, the method comprises the step of creating a tag register comprising a plurality of tags, in which register each tag is accessible by means of a user interface to open a list of the events stored with the respective tag.

In one embodiment, the step of defining a time period comprises the steps of defining a start time by setting the tag to be used from now on and forward; defining a stop time by input of a command to terminate use of the tag.

In one embodiment, the step of defining a time period comprises the step of defining a start time and a stop time, between which the tag will be used.

In one embodiment, the events include phone calls to and from a mobile telephone function of the electronic device.

In one embodiment, the events include electronic messages transmitted to and from the electronic device.

In one embodiment, the events include virtual business cards received in the electronic device.

In one embodiment, the events include digital pictures captured by means of a digital camera function of the electronic device.

In one embodiment, the events include video data captured by means of a digital video recorder function of the electronic device.

In one embodiment, the events include audio data captured by means of an audio recorder function of the electronic device.

In one embodiment, the events include computer files created or received in the electronic device.

In one embodiment, the step of defining a tag comprises the step of selecting which type or types of events to tag, from a plurality of identified events.

In one embodiment, the plurality of identified events include at least on from the group of event types containing: calls dialed and received, messages sent and received, business cards received, pictures taken and video or audio segments recorded, data files downloaded or created, links to web sites accessed.

In one embodiment, the method comprises the steps of:
 defining a plurality of tags with associated time periods for using the respective tag;
 assigning, to data related to an event stored at a point in time, two or more tags having associated time periods covering said point in time.

According to a second aspect, the invention relates to a method for accessing data stored in an electronic device, comprising the steps of:

operating a user interface to select a tag, which tag is assigned to data related to all events which are carried out and stored using the electronic device during a defined time period;

presenting a list of the events stored with the selected tag.

In one embodiment, the method comprises the step of presenting a tag register comprising a plurality of tags, in which register each tag is accessible by means of a user interface to open a list of the events stored with the respective tag.

In one embodiment, the method comprises the step of:

operating the user interface to select a type of event;

presenting a list of events of the selected type which are stored with the selected tag.

According to a third aspect, the invention relates to a method for storing data in an electronic device, comprising the steps of:

opening an electronic calendar in the electronic device;

scheduling a time period in the electronic calendar;

defining a tag which is assignable to data related to events which are carried out and stored using the electronic device;

configuring the electronic device to assign the tag to data related to events stored using the electronic device during said time period.

In one embodiment, the method comprises the steps of:

defining a subject for the scheduled time period;

defining a title for the tag dependent on the subject.

In one embodiment, the step of defining a title for the tag comprises the step of using the subject as title.

In one embodiment, the step of defining a title for the tag comprises the step of using an abbreviation of the subject as title.

In one embodiment, the step of configuring the electronic device to assign the tag to data related to events stored using the electronic device during said time period includes the step of assigning the tag only if the time period exceeds a predetermined length.

BRIEF DESCRIPTION OF THE DRAWING

The features and advantages of the present invention will be more apparent from the following description of the preferred embodiments with reference to the accompanying drawings, on which FIG. 1 schematically illustrates an electronic device in the form of a mobile phone, configured to be used in accordance with an embodiment of the invention;

FIGS. 3 to 6 schematically illustrate display screens for configuring tags and handling tagged data related to events carried out using an electronic device, in accordance with various embodiments of the invention.

DETAILED DESCRIPTION OF PREFERRED EMBODIMENTS

The present description relates to the field of electronic devices capable of carrying out different tasks and handling and storing data of different types. A computer is one example of such an electronic device. However, the invention will be described in the context of a mobile phone, which is best known mode of operation. Furthermore, it should be emphasized that the term comprising or comprises, when used in this description and in the appended claims to indicate included features, elements or steps, is in no way to be interpreted as excluding the presence of other features elements or steps than those expressly stated.

Exemplary embodiments will now be described with references made to the accompanying drawings.

State of the art mobile phones may be used for transmitting and receiving messages and for placing and receiving telephone calls. Furthermore, a mobile phone comprising a built-in or attachable digital camera may also be used for capturing pictures and potentially also video sequences. The mobile phone may also be used for downloading data files and for creating data files, and many other functions are plausible.

Figure 1:
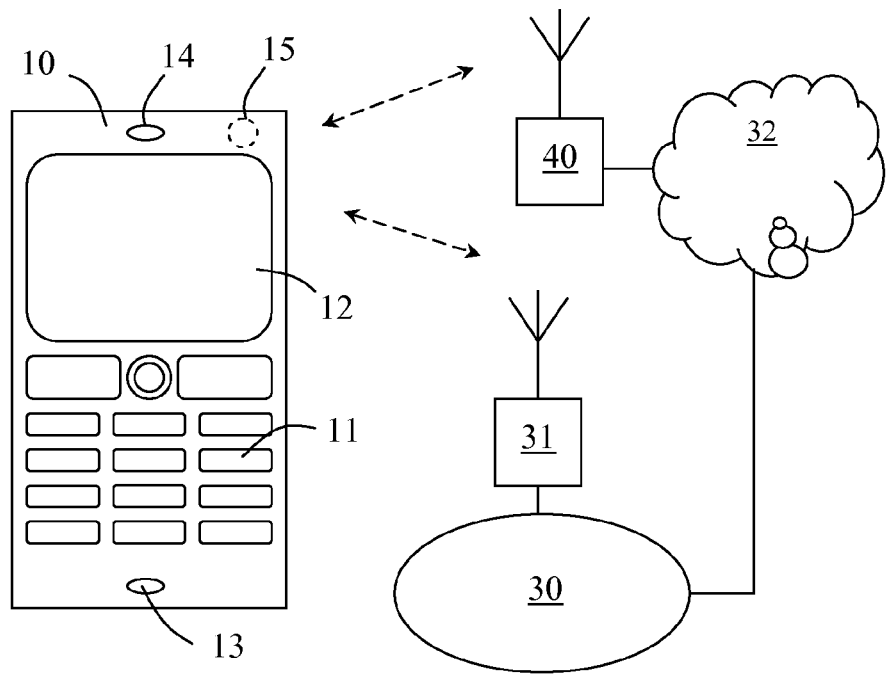
Figure 2:
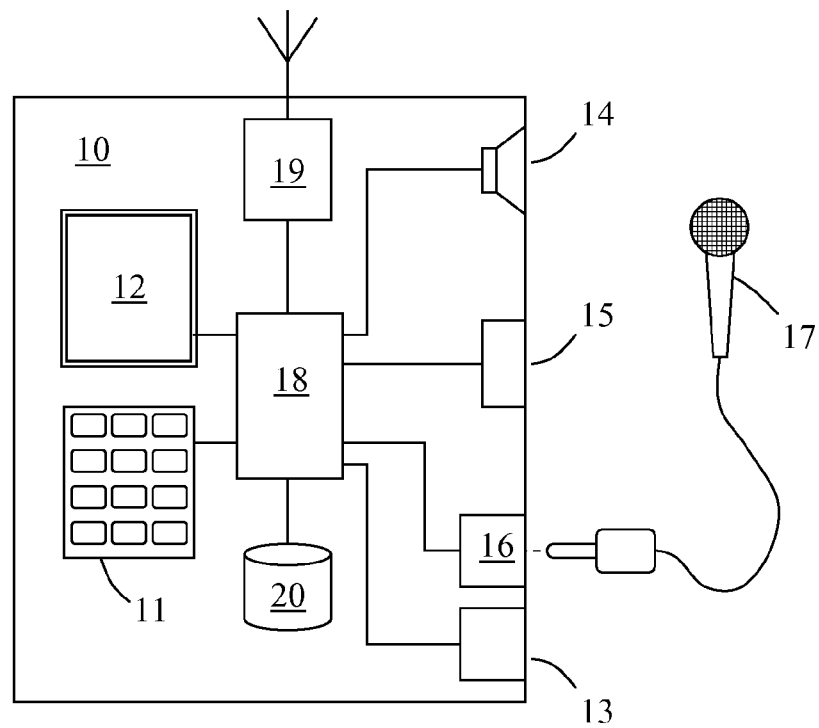
FIG. 2 schematically illustrates functional blocks of the electronic device of FIG. 1.

FIG. 1 illustrates the outer appearance of an electronic device in the form of a typical mobile phone, which may be configured to employ an embodiment of the present invention, whereas FIG. 2 schematically illustrates functional features of the mobile phone by means of a block diagram. It should be noted that the elements indicated in FIG. 2 need not necessarily be physically divided in the manner shown, and that it is the functional relationship rather than the structural arrangement that is of primary interest. Furthermore, the outer appearance of the mobile phone need not take the indicated shape of FIG. 1, instead the mobile phone may e.g. be of a clamshell type, a jack knife type, or the like.

Mobile phone 10 is configured to operate in a cellular radio communications network 30, by radio communication with a base station 31, or by direct radio communication with another mobile phone as a walkie-talkie. The radio communications network 30 may e.g. be a GSM network or a WCDMA 3G network. In addition, mobile phone 10 may be provided with a radio signal transceiver configured to operate in a IEEE 802.11 WLAN over an access point 40 connected to the Internet 32.

The mobile phone 10 includes a user interface comprising an input part, preferably including a set of keys 11, and additionally or optionally a touch-sensitive display. An output part of the user interface includes a display 12 for presenting information to a mobile phone user. For the purpose of conducting speech communication, mobile phone 10 further preferably includes a microphone 13 and a speaker 14. Besides speaker 14, an additional speaker (not shown) may be employed inter alia for the purpose of providing alert signals to a mobile phone user, and as a loudspeaker. Otherwise, or in addition, speakers for presenting audio, such as music, to a user are typically provided in the form of a headset (not shown) which is communicatively connectable to the mobile phone. Mobile phone 10 may also include a digital camera 15. Typically, the camera 15 is placed on an opposite side of where display 12 is arranged, such that the display may be used as a viewer, which is why camera 15 is illustrated in phantom in FIG. 1. Additionally, another camera for video conferencing purposes (not shown) may be included on the same side as the display.

FIG. 2 illustrates the mobile phone 10 in the form of a block diagram. The actual function of mobile phone 10 as a radio communications device is not crucial to the invention, and will therefore not be described in detail. A radio signal transceiver 19 is included for transmission and reception of radio signals to and from a radio network or a radio terminal. As an example, the radio signal transceiver 19 may include an antenna and circuitry configured to transmit and receive communication signals over the mobile phone network 30. Other possible additional or alternative transceiver systems 19 may include an antenna and circuitry configured to receive radio signals over a direct WLAN Internet connection, or using a short range protocol such as bluetooth. The radio transceiver 19 is connected to a controller 18, which in a preferred embodiment represents a microprocessor system with associated memory space, operation software, and application software. Controller 18 is depicted in FIG. 2 as a central element, responsible for carrying out different tasks of the mobile phone, such as controlling communication sessions as well as controlling camera 15 and managing the user interface. A socket 16 is also illustrated as an example of how an audio receiving device such as a microphone 17 may be plugged in for the purpose of recording audio signals.

When mobile phone 10 is used for placing a call, or when a call is received, an indication of the call is stored in a call list. Typically, dialed calls are placed in one list and answered calls in another, and missed calls in a third, whereas all calls most often also may be seen together in a common list. Each item in the list or lists normally includes a time stamp and an identity of the remote party, i.e. the caller or recipient, either by means of a phone number or a name associated with the phone number in question, stored in a phone book in a memory 20 of the phone, such as a local memory or a SIM card. For the sake of simplicity, only one memory 20 is shown in the drawing, simply to illustrate the function of storing data of different kinds, such as real data files or as logs. However, the skilled person will understand that different memory circuits may well be used.

When mobile phone 10 is used for taking pictures or recording video segments using camera 15, data files for the pictures and video segments are also typically stored in dedicated places in a memory 20. To access these files at a later stage, a menu system shown on display 12 is generally used, by means of which a camera function may be accessed. Once entering camera mode, previously stored pictures may be retrieved and shown.

Another field of use for a mobile phone is to exchange virtual business cards, VBC. A virtual business card may be described as a set of traditional business card information in digital form, such as name, title, employer, address and contact information, and possibly a photograph, but without the paper card. The business card may be exchanged using e.g. bluetooth or an IR connection, and is then stored in a contact list of memory 20 in the mobile phone.

As mentioned, a problem with state of the art mobile phones is that while the number of different functions for which the phone may be used increases, its size is by necessity maintained very small, since this is an overall market requirement. Furthermore, different types of data related to different types of events are stored in different ways and in different folders, and may be tricky to find with the limited user interface.

According to an embodiment of the invention, controller 18 is configured to allow a user to set the mobile phone to tag any event carried out by means of the mobile phone, by defining the tag in advance and setting a time period, open or closed, during which to use the tag. This way, a means for sorting information using the tag as a label is achieved, which applies to all events, and preferably also to a plurality of different types of events, carried out within the dedicated time period.

FIG. 3 schematically illustrates how a new tag is configured in accordance with an embodiment of the invention, using the user interface 111 and 12 of the mobile phone, where the drawing shows information presented on display 12. Each tag is given a name or label, which preferably should be explanatory and easily recognizable. Furthermore, the time period during which the mobile phone will apply the tag is selected by the user. As an example, the time may be set to "from now on and forward" by clicking that option. It is also possible to enter direct start times and stop times. If no stop time is entered, the time period is configured as an open period, which means that it has to be terminated by reconfiguring the tag at a later stage. In a preferred embodiment, it is also possible to configure more than one tag. More specifically, it is preferably also possible to define a plurality of tags which also have overlapping time periods. Data stored related to an event occurring at a point in time which is covered by the respective time period of more than one tag, is then tagged with all such tags. As an example, one tag may be defined prior to a business trip, covering the entire trip. The time period for that trip, and the associated tag, may then be e.g. one week. During that particular trip, an important meeting lasting one day is held with a business associate. A specific tag may then be defined for that meeting, either when it starts or in advance. A result of this tag configuration will be that during the week of the business trip, data related to events recorded by the electronic device are stored with the business trip tag. Furthermore, data related to events occurring on the specific day of the business trip will be tagged with both the business trip tag and with the business meeting tag.

In a preferred embodiment, it is possible to define tags in an electronic calendar stored in the electronic device. Needless to say, the tags may just as well be defined in an electronic calendar of another device, such as a personal computer, and subsequently be transferred to the electronic device in which events are subsequently carried out or detected and related data is tagged. In an electronic calendar it is typically possible to schedule new appointments, and also to make changes in scheduled appointments. For each appointment a time period is defined, and a subject of the appointment is preferably also entered. In one embodiment, configuration of a tag is automatically linked to the scheduling process of the calendar, such that the start and stop time points for the scheduled appointment are automatically also used for the associated tag. As far as the title of the tag is concerned, this may in reality be configured in different ways. In one specific embodiment, the title of the tag is automatically selected by a computer program included in or linked to the electronic calendar, by reading the subject of the appointment as entered by a user. The tag may be given a title which is identical to the subject. Alternatively, the subject may be abbreviated to a maximum number of characters or words, which is used as the tag title. A specific input field for the tag title may also be included in the calendar, similar to the uppermost input field of FIG. 3, in addition to an input field for the subject of the appointment. Any text entered in the subject input field may then automatically be copied to the tag title field, where it then may be manually amended to e.g. a shorter form, or to a more precise tag definition. As yet another example, a list of predefined tag titles may be included in software code, from which partial titles may be selected. Such partial titles may e.g. be "business-_____" or vacation-_____", where the underlined portion indicates data to be filled in by the user to more specifically define the title.

As an example, assume that a user of the electronic device makes an appointment in the electronic calendar, naming the subject "business trip". A tag is then also automatically defined, with the time period as entered for the appointment by the user. Alternatively, a tag is only defined if a "link tag" check box is also marked in the electronic calendar. Furthermore, a tag title field is presented. If the subject text is automatically presented also in the tag title field, it may be worthwhile to amend it, or else the tag will not be very descriptive and it will be difficult to subsequently find the correct tag among a plurality of stored tags in the electronic device. The user may therefore amend the text in the title field to e.g. "London Medical Congress 2005". Similar to what has already been outlined, it may also be possible to schedule other appointments in the electronic calendar, which overlaps other appointments already stored in the calendar, and in this way also overlapping tags may be defined. In one embodiment, automatic definition of a tag when an appointment is scheduled in an electronic calendar is only performed if the time period entered for the appointment exceeds a predetermined length. Such a minimum length may e.g. by a certain number of hours, such as at least 5 hours, in order to avoid creation of special tags for short meetings. Alternatively, the minimum time period may be one day, two days, or more. The resolution of the minimum length is preferably reconfigurable by the user through the user interface.

FIG. 4 illustrates a list of tags, or a tag register, which preferably may be retrieved by e.g. clicking a tag icon (not shown) on the display 12, or by using a menu system. Activation of the first item in the tag register, "Define new", will take the user to the screen shown in FIG. 3. After that first tag, a number of previously used tags are listed, of which three are labeled in the drawing. The user of the mobile phone 10 in question is a frequent traveler. In order to sort the information received and events carried out during business trips and vacations, the user has defined specific tags for each occasion. During each occasion, or more correctly, during the time period for which the tag in question was active, each event carried out using the mobile phone was stored with that tag. This way, all pictures, videos and so on which were captured during that trip may be accessed from the tag register. With reference to FIG. 3, or the electronic calendar embodiment described above, a tag may be defined for a future time period if it is known when the period will start and end, or the tag may be manually started or manually stopped.

Figure 5:
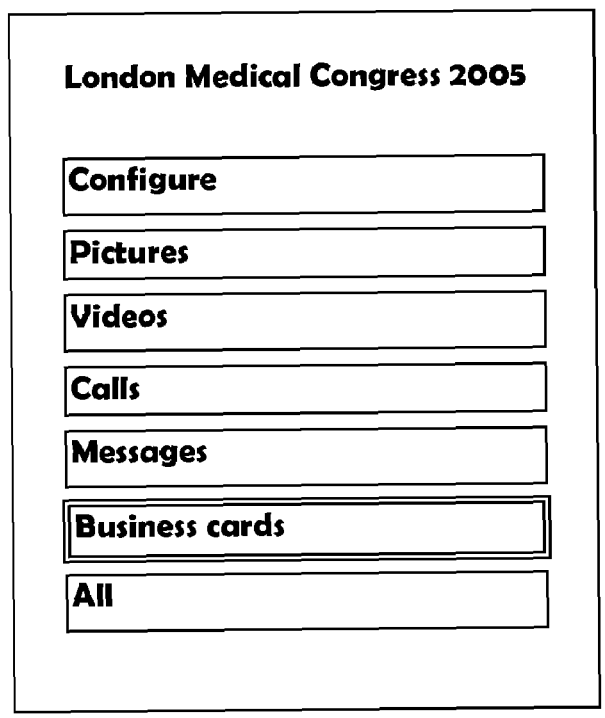

FIG. 5 schematically illustrates the screen shown when the "London Medical Congress 2005" tag is selected from the screen of FIG. 4, as indicated by the double frame of that tag. A first item of the list for this tag may be "configure", activation of which preferably leads to the screen of FIG. 3 or a similar screen, in which it is possible to deactivate the tag. The time period for this tag may be shown only when the Configure item is selected, or it may e.g. be shown together with the title at the top of the screen of FIG. 5. Under the Configure item, a number of menu items for different types of events carried out during the relevant time period are shown. Each of these different events may always be shown, regardless of whether or not e.g. any picture has in fact been taken. However, a menu item is preferably not included in the list of the tag until such an event has occurred. In the present example, the user has taken pictures, recorded video segments, placed or received calls as well as messages, and received virtual business cards. In the illustrated embodiment, these different kinds of events are sorted under separate menu items, but it is of course also possible to display an indication of all events together, e.g. in order of type or date. Furthermore, even if they are sorted under different menu items, selection of the shown "All" alternative preferably causes all events to be shown in one common list (not shown). In a preferred embodiment, a search function is also included in the electronic device. By using the search function, it should be possible to search for information related to events based on a combination of search items. As an example, it is in one embodiment possible to enter, or select from a list, a tag title and combine it with an event type search criterion. The search criteria may then logically be e.g. ((tag title=London Medical Congress 2005) AND (event type=received calls)). Such search criteria are advantageous to quickly sort through the stored information. The software needed to realize such a search function may as such be based on state of the art technology.

Figure 6:
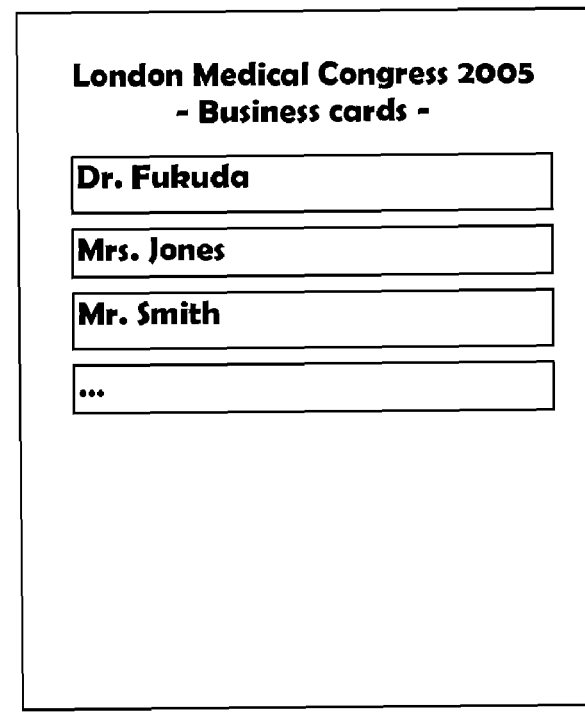

In FIG. 6 the business card item has been selected, which leads to the presentation of all business cards received during the time period of the tag in question, which is also identified at the top of the screen. By instead selecting pictures, all pictures captured during the London Medical Congress 2005 will be shown, and so on. For certain menu items, such as Calls, it may be helpful to have submenus for e.g. answered and placed calls.

By means of the invention a novel way of storing and accessing data related to events carried out using an electronic device is provided, by using tags which are defined to be used for all events during a given time period. As the flow of information increases, and the list of functions and services which may be used in a single electronic device gets longer and longer, the need for assistance in navigating among stored data becomes greater. The invention provides a useful method for this scenario, without requiring advanced technical skills or extensive user interaction. As an example, imagine that a user realizes that he once met a certain person and received a virtual business card, but fails to recall the persons name and exactly when the meeting took place. Finding the information amongst hundreds of stored business cards will be time-consuming. However, if the user recalls in what circumstance he met the person, namely at a Medical Congress in London, the tag concept will be very helpful and most likely lead the user to a limited list of business cards, in which the correct one can be located, in only a few key steps.

The principles of the present invention have been described in the foregoing by examples of embodiments or modes of operations. However, the invention should not be construed as being limited to the particular embodiments discussed above, which are to be regarded as illustrative rather than restrictive. In the foregoing, the tags have been defined to be used for all events. In one embodiment, such as the ones described above, tagging is performed for all types of events, out of a certain number of event types, including e.g. calls dialed and received, messages sent and received, business cards received, pictures taken and video or audio segments recorded, as well as e.g. data files downloaded or created, links to web sites accessed, and so on. This list could of course be longer.

As another example, the tags may also be configured, in the screen of FIG. 3, to be assigned to all events of only one or a limited number of selected types of events, such as only for pictures and/or videos, and/or for business cards. In such an embodiment, selection of the events to tag is made in the screen of FIG. 3 by clicking to activate any one or more of a number of listed event types, such as the event types listed above.

It should be appreciated that variations may be made in the described embodiments by persons skilled in the art, without departing from the scope of the present invention as defined by the appended claims.

The invention claimed is:

1. A method for storing different types of data in a mobile telephone, comprising the steps of:
 defining a tag, the tag being a user-specified name for a period of time and the tag assignable to different types of data files and log entries stored by the mobile telephone, the different types of data files and log entries each respectively related to a different type of event that is carried out by the mobile telephone, the events including two or more of phone calls to and from the mobile telephone, electronic messages transmitted to and from the mobile telephone, virtual business cards received in the mobile telephone, digital pictures and video data captured with the mobile telephone, audio data captured with the mobile telephone, data files created or received in the mobile telephone, or access to web sites with the mobile telephone;

during the period of time, assigning the tag to each data file and log entry stored with the mobile telephone for which the tag is assignable; and sorting the stored data files and log entries in accordance with the tag and then by event type.

2. The method of claim 1, comprising the step of:
creating a tag register comprising a plurality of tags, in which register each tag is accessible by means of a user interface to open a list of the events stored with the respective tag.

3. The method of claim 2, further comprising
presenting on a display a list of the events that are assigned a selected one of the tags.

4. The method of claim 1, wherein the step of defining the time period comprises the steps of:
defining a start time by setting the tag to be used from now on and forward; and
defining a stop time by input of a command to terminate use of the tag.

5. The method of claim 1, wherein the step of defining a time period comprises the step of:
defining a start time and a stop time, between which the tag will be used.

6. The method of claim 1, wherein the step of defining a tag comprises the step of selecting which types of events to tag, from a plurality of identified events.

7. The method of claim 1, comprising the steps of:
defining a plurality of tags with associated time periods for using the respective tag;
assigning, to data related to an event stored at a point in time, two or more tags having associated time periods covering said point in time.

8. The method of claim 1, wherein determining the time periods includes:
opening an electronic calendar in the electronic device;
scheduling a calendar entry in the electronic calendar, the time period corresponding to the calendar entry.

9. The method of claim 8, wherein the tag is assigned only if the time period exceeds a predetermined length.

10. The method of claim 8, wherein the name of the tag and a name of the calendar entry are different.

* * * * *